Z. SZPOR.
PRIMARY BATTERY.
APPLICATION FILED SEPT. 12, 1911.
1,022,276.
Patented Apr. 2, 1912.
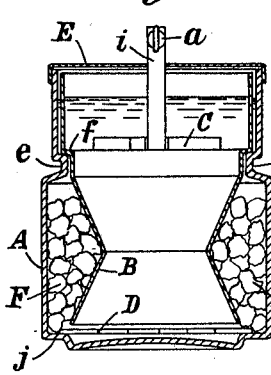
Fig. 1.
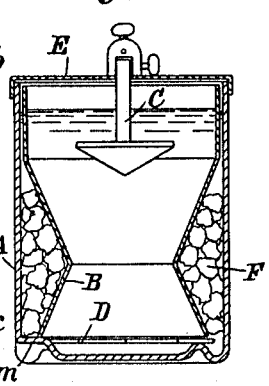
Fig. 5.
Fig. 7.
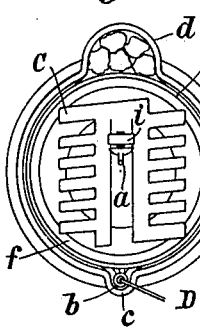
Fig. 2.
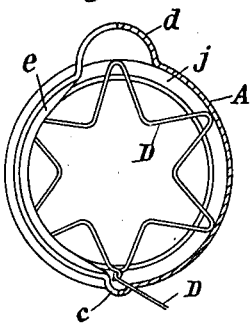
Fig. 3.
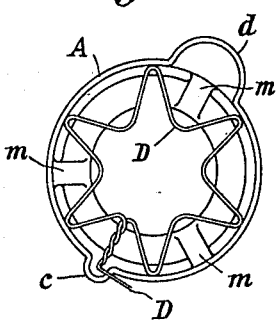
Fig. 8.
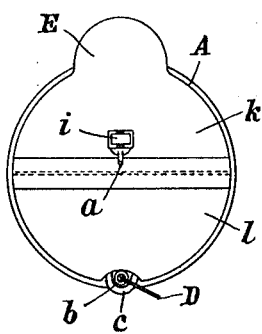
Fig. 4.
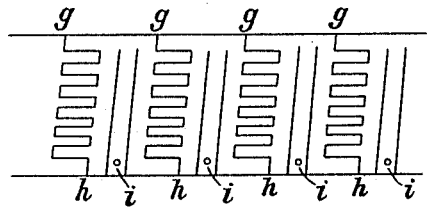
Fig. 6.
WITNESSES:
John Murtagh
L. J. Murphy
INVENTOR:
Zdzisław Szpor
ATTORNEYS.

UNITED STATES PATENT OFFICE.

ZDZISLAW SZPOR, OF STANISLAWOW, AUSTRIA-HUNGARY.

PRIMARY BATTERY.

1,022,276. Specification of Letters Patent. Patented Apr. 2, 1912.

Application filed September 12, 1911. Serial No. 648,988.

*To all whom it may concern:*

Be it known that I, ZDZISLAW SZPOR, a subject of the Austro-Hungarian Emperor, and residing at Stanislawow, Galicia, Austria-Hungary, have invented certain new and useful Improvements in Primary Batteries, of which the following is a specification.

My invention relates generally to primary batteries comprising a soluble depolarizer, and particularly e. g. to sulfate of copper cells.

According to my invention the battery-jar is divided by a fitting into an outer and inner chamber communicating with one another near the bottom, the inner chamber serving as the cell proper containing the electrolyte, while the outer serves in such manner as a reservoir for the depolarizer that the liquid in this reservoir protects the electrolyte in the inner chamber from injurious influence due to change of temperature. Further, according to my invention the soluble electrode arranged horizontally is formed of strips of sheet metal made without waste from one plate by congruent zigzag cuts. The other electrode of the cell is made of a wire bent star-shaped mounted suitably near the bottom in such manner that it cannot be impurified by any mud deposited by the solvent electrode. The cover of the cell is made of two parts connected together in the manner of a hinge so that it is possible partially to open the cell without shaking the solvent electrode.

Several illustrative embodiments of my invention are represented by way of example in the accompanying drawing, wherein:—

Figure 1 is a vertical section through one form of cell, the zinc pole not being shown in section and the cover being shown partly broken away; Fig. 2 is a plan, the cover having been removed; Fig. 3 a plan of the battery-jar with the copper electrode partially in horizontal section, and Fig. 4 a plan of the covered cell; Fig. 5 is a vertical section through the cell taken in a plane at right angles to Fig. 1, the zinc electrode not being shown in section and the cover being shown somewhat raised; Fig. 6 shows how the zinc electrodes can be stamped without waste out of a sheet; Fig. 7 is a vertical section through a modified form of cell and Fig. 8 a plan of the battery-jar together with the copper electrode of the form shown in Fig. 7.

Referring to the drawing, and firstly particularly to Figs. 1 to 6, my improved cell comprises the battery-jar A, the fitting B, the zinc electrode C provided with the terminal $a$, the copper electrode D with its tube of insulation $b$, and the cover E. The battery-jar A is a vessel having a bottom which is dished somewhat in the middle for receiving any mud deposited from the zinc electrode. The side or periphery of the jar has not only a vertical groove or channel $c$ for accommodating the conductor connected to the copper electrode, but also both a second similar charging channel or groove $d$ for charging crystals of sulfate of copper, and lateral horizontal shoulders or constrictions $e$ in its upper part serving as support for the fitting B. This fitting is a muff-shaped partition which is so supported on the edge $e$ of the jar by means of its shoulder $f$ that a gap is left between its bottom edge and the bottom of the battery-jar; otherwise the fitting is so shaped and of such size that the osmotic resistance of the column of liquid filling it is sufficiently large to prevent no more sulfate of copper being diffused from the cross-section of the greatest concentration of sulfate of copper (bottom opening of the fitting) to that cross-section where there may be no copper sulfate (close under the zinc electrode) than can be consumed in equal time by the electric current.

The zinc electrodes are made out of strips of sheet metal by congruent, zigzag cuts $g, h$. These strips $i$, are cut out of the same sheet of zinc, bent upward and provided at their ends with binding screws $a$ serving as conductors. In this manner the zinc obtains an irregular shape and in spite of being used horizontally allows any gas bubbles which form to pass freely through it. The zinc electrode is supported in the upper, enlarged part of the fitting B on the inner face of the shoulder $f$. The copper electrode D is a wire bent star-shaped lying on the projecting edge $j$ of the bottom of the jar and is protected by the bottom edge of the fitting B from changing its horizontal position. A tube $b$ of insulating material is placed over the part of the copper electrode led out of the cell. The edge of the cover E projects over the edge of the battery-jar, and the cover comprises two parts hinged together, of which the one $k$ has a hole for the passage of the strip $i$ leading to the zinc electrode, and the other $l$ a recess for allowing the conductor leading to the wire D to pass. The purpose of this division of the cover is to enable the cell to be partially opened without shaking the zinc electrode. This cell is assembled and manipulated as follows:—The copper electrode D together with its small tube $b$ is first put into the battery-jar A, the fitting B is then inserted and then the definite, exactly measured quantity of crystals of sulfate of copper is put through the channel $d$ into the chamber F bounded by the battery-jar and the fitting B. The zinc electrode C is then inserted, the cover E put in position, the zinc electrode provided with the binding screw $a$, and the cell is then placed in its position with the copper electrode toward the front. The sulfate of zinc solution (about 15%) made separately by suitably diluting the contents of used cells is now poured into the fitting F of the cell after it has been partially exposed by raising part of the cover. The liquid flows through the gap between the fitting and the bottom of the jar into the chamber F filled with sulfate of copper crystals. After pouring in the electrolyte the cover is closed and the cell left at rest. When evaporated liquid has to be replaced, after carefully partially opening the cell some water is poured into the fitting. This cell may be modified in various ways without departing from the scope of the invention. For example, instead of the fitting being hung from the edge of the battery-jar, it may rest on suitable projections $m$ of the bottom projecting somewhat above the copper electrode which rests on an annular rim in the bottom of the jar, as shown in Figs. 7 and 8; further, a zinc electrode of any desired shape and suspended in any desired manner, e. g. by means of a clamp to the cover, may be employed. The zinc electrode consists in this case of a disk-shaped plate with an inverted conical addition at its under side. Such constructions of cells may be employed in all those cells, in which is used a soluble depolarizer which may not directly contact with the soluble electrode.

The advantages of my cell as compared with other sulfate of copper cells are as follows:—Firstly, the electric resistance of the electrolyte requires to be only as great as is necessary having regard to the convenient retardation of the diffusion of the sulfate of copper, and consequently the resistance of the cell may be a minimum. Secondly, the mechanical mixture of the layers of liquid which is caused by the horizontal differences of temperature occurring during changes of temperature is prevented by the differences of temperature being taken up by the outer liquid in the chamber F. Thirdly, the layers of liquid located near the axis of the vessel participate less in the vibrations caused by shaking than the outer liquid and consequently are better protected from mechanical mixing. Fourthly, in consequence of the two electrodes being made as flat as possible and located horizontally, no differences of concentration between various points of the same electrode make themselves felt, so that the electrodes are not unnecessarily destroyed and the electromotive force of the cell is not diminished. Fifthly, when filling the cell or pouring the electrolyte into it, the liquid contacting with the zinc electrode remains perfectly free from sulfate of copper. Sixthly, the cell can be opened and refilled without shaking the zinc electrode at all. Seventhly, the copper electrode is not impurified by the mud deposited by the zinc electrode and therefore forms a valuable residue.

I claim:—

1. In a primary battery, the combination of a jar, a muff-shaped partition or fitting supported therein clear of the bottom and dividing the jar into an outer chamber for the soluble depolarizer and in an inner chamber for the electrolyte, said chambers being connected with each other by a ring-shaped slot, a flat electrode at the bottom of the jar and a flat soluble electrode at the upper part of the fitting.

2. In a primary battery, the combination of a jar, a muff-shaped partition or fitting supported therein clear of the bottom and dividing the jar into an outer chamber for the soluble depolarizer and in an inner chamber for the electrolyte, said chambers being connected with each other by a ring-shaped slot, a flat electrode located at the bottom of the jar and formed in the shape of a star, the inner corners of which form an opening corresponding to the contraction of the fitting, and a flat soluble electrode at the upper part of the fitting.

3. In a primary battery, the combination of a jar, a muff-shaped partition or fitting supported therein clear of the bottom and dividing the jar into an outer chamber for the soluble depolarizer and in an inner chamber for the electrolyte, said chambers being connected with each other by a ring-shaped slot, a wire electrode located at the bottom of the jar, and a flat soluble electrode located in the upper enlarged portion of the fitting, and means for supporting the same in the upper part of the fitting.

In testimony, that I claim the foregoing as my invention, I have signed my name in presence of two subscribing witnesses.

ZDZISLAW SZPOR.

Witnesses:
   Ada Maria Berger,
   August Fugger.

---

Copies of this patent may be obtained for five cents each, by addressing the "Commissioner of Patents, Washington, D. C."